Patented Oct. 26, 1954

2,692,867

UNITED STATES PATENT OFFICE 2,692,867

MANUFACTURE OF CATION-EXCHANGING SYNTHETIC RESINS

Heinrich Passing, Leverkusen, Rudolf Bauer, Koln-Dunnwald, and Detlef Delfs, Leverkusen, Germany, assignors to Farbenfabriken Bayer Aktiengesellschaft, Leverkusen, Germany, a corporation of Germany No Drawing. Application February 28, 1951, Serial No. 213,288

Claims priority, application Germany February 28, 1950

10 Claims. (Cl. 260—2.2)

The present invention relates to a process of producing new cation-exchanging synthetic resins.

One object of the present invention is a process of producing cation-exchanging resins from naphthalene monosulfonic acids.

A further object of the invention is the condensation products according to this process.

A still further object of the invention comprises the process for exchanging cations from aqueous solutions or adsorbing materials by means of the new synthetic resins.

Other objects will become apparent as the following description proceeds.

It has been found that resins with marked and valuable cation-exchanging properties are obtained by condensation of (a) an aldehyde, (b) naphthalene monosulfonic acids or their preliminary condensation products obtained with an aldehyde and (c) one or more monohydric phenols in an acid medium by the simultaneous condensation of (d) aromatic hydroxy or amino compounds having at least two nuclear carbon atoms capable of taking part in the condensation and at least one further water-solubilizing group. The homogeneity of the resultant gels required for producing valuable resin exchangers is surprisingly achieved by the addition of the said aromatic hydroxy or amino compounds which as such are generally not capable of readily forming resins.

As naphthalene monosulfonic acids may be employed according to the present invention particularly β-naphthalene monosulfonic acid and α-naphthalene monosulfonic acid and mixtures thereof as well as their alkyl substitution products. The process of the invention does not require the employment of isolated naphthalene monosulfonic acids. It is also possible to use the technical sulfonation mixture as obtained in the monosulfonation of technical naphthalene directly for condensation. The small amounts of naphthalene dimonosulfonic acids and unsulfonated naphthalene, that are mostly contained in these sulfonation mixtures, as well as the excess sulfuric acid do not disturb the condensation when carried through with formaldehyde or its equivalents. It is often of advantage to preliminarily condense the naphthalene monosulfonic acids or the technical naphthalene sulfonation mixture with aldehyde. Suitable phenols according to the invention are, for instance, phenol, cresols, xylenols, dihydroxy diphenyl, dihydroxy diphenyl sulfone and dihydroxy diphenyl ketone. These phenols may be employed either separately or in mixture with each other in quantities of, for instance, 0.5 mol to 3 mols referred to one mol of naphthalene monosulfonic acid.

It is a feature of the present invention to add prior to the condensation aromatic hydroxy or amino compounds containing at least one further water-solubilizing group, such as, for instance, hydroxy-, carboxyl-, sulfonic acid- or sulfonamide groups, for producing clear gels and mechanically resistant cation-exchanging resins. The aromatic hydroxy or amino compounds may contain one or more of said solubilizing groups with the reservation that at least two reactive positions are free, i. e., for instance, at least both o-positions or one o-position and the p-position of the hydroxy and amino benzenes. Such compounds are, for instance, 1.3-dihydroxy benzene, 3.5-dihydroxy benzoic acid, 1.7-dihydroxy naphthalene, 1.-aminobenzene-3-sulfonic acid, phenylamino acetic acid, 2.8-dihydroxynaphthalene-3-carboxylic acid, 1-hydroxynaphthalene-6-sulfonic acid, or -7-sulfonic acid, 1.6- or 1.7-dihydroxynaphthalene - 3 - sulfonic acid, 1.8 - dihydroxynaphthalene-3-carboxylic acid-6-sulfonic acid, 1.8-dihydroxynaphthalene-3.6-disulfonic acid, 1-amino-5-hydroxynaphthalene-7-sulfonic acid, 1-amino-8-hydroxynaphthalene-3.6-disulfonic acid, 1-aminonaphthalene-6-sulfonic acid, 2-aminonaphthalene-6.8-disulfonic acid, furthermore, the condensation products of aromatic hydroxy compounds with oxo compounds containing sulfonic acid groups, such as, for instance, the sulfonate of aromatic aldehydes and the reaction products of sulfurous acid and unsaturated aliphatic oxo compounds.

The amount of the aforesaid compounds to be used in the reaction for obtaining homogeneous hydrogels depends on the most various conditions. The desired homogeneity of the hydrogels is generally accomplished by using 2–50 mols-per cent of said compounds referred to the phenols. 5–20 mols-per cent are preferably employed. Smaller additions of hydroxy or amino compounds suffice for carrying through the reaction if their reactivity with formaldehyde approximately corresponds to that of phenols, if they contain more solubilizing groups or if higher molecular condensation products of naphthalene monosulfonic acid with formaldehyde are used. When in the proportion of phenol to naphthalene monosulfonic acid the amount of phenol is increased or when the condensation is carried out at higher temperature, the amount of aromatic hydroxy or amino compounds to be added has likewise to be increased under otherwise equal conditions.

The above defined condensation products of aromatic hydroxy compounds and oxo compounds containing sulfonic acid groups may be prepared in a special process or, if desired, may be also produced in the reaction mixture in the presence of naphthalene monosulfonic acids, phenol, etc.

Condensation is carried out in an acid medium, for instance, with the addition of mineral acids or stronger organic acids—in most cases the acidity of naphthalene monosulfonic acid suffices for accomplishing the reaction—with the use of more than totally one mol of aldehyde referred to one mol of the substance yielding resin. It may be of advantage to add the necessary amount of aldehyde during various stages of the reaction while gradually increasing the temperature. The homogeneous hydrogels thus obtained undergo usual treatment for forming cation-exchangers.

The present invention is further illustrated by the following examples without being restricted thereto, the parts being by weight.

Example 1

102 parts of naphthalene are sulfonated with 102 parts of concentrated sulfuric acid at 160–165° C. The sulfonation mixture is introduced into 570 parts of water. Thereto are added 94 parts of phenol and 32 parts of 1.8-dihydroxynaphthalene-3.6-disulfonic acid and, after the latter has been dissolved, 75 parts of formalin of 30% strength at 50° C. After standing at that temperature for 2 hours a further 225 parts of formalin are added and the temperature is kept at 50–60° C. for 5–6 hours. The gel is subsequently after-hardened in the wind tube and dried at 90° C. Thereupon the reaction product is ground and sifted.

The naphthalene sulfonation mixture may be replaced in the above reaction by 166 parts of naphthalene-α- or -β-sulfonic acid or mixtures thereof.

Example 2

128 parts of naphthalene and 128 parts of concentrated sulfonic acid are sulfonated at 160–165° C. and 125 parts of dihydroxy diphenyl sulfone are dissolved in the sulfonation mixture. After adding a solution of 32 parts of 1.8-dihydroxynaphthalene - 3.6 - disulfonic acid in 137 parts of water, the mixture is heated to 105–110° C., 250 parts of formalin of 30% strength are gradually introduced and the mixture is left standing at that temperature for 24 hours. The resultant gel is dried in the wind tube at 100° C. and treated as usual to form a cation-exchanging resin.

In the following examples a preliminary condensate of naphthalene monosulfonic acid and formaldehyde is used.

Example 3

128 parts of naphthalene and 128 parts of concentrated sulfuric acid are sulfonated at 160–165° C. for two hours and the sulfonation mixture obtained is introduced into 234 parts of water. 110 parts of formalin of 30% strength are added and the mixture is heated at 130–135° C. for 10 hours. A dark-brown viscous solution of the preliminary condensate is thus obtained.

Example 4

56 parts of phenol and the solution of 44 parts of resorcin in 100 parts of water are added to 600 parts of the cation-exchanging product obtained according to Example 3. After adding 200 parts of formalin of 30% strength the mixture is heated to 50–60° C. within two hours and this temperature is kept for a further 6–8 hours. The resultant gel yields as cation-exchanger with marked technical properties as described in Example 1.

Example 5

600 parts of the preliminary condensation product obtained according to Example 3 are mixed with the solution of 75 parts of phenol and 22 parts of resorcin in 103 parts of water and with 200 parts of formalin of 30% strength. After 48 hours' standing at a temperature not exceeding 25° C. the mixture is heated to 60–70° C. and this temperature is kept for 6–8 hours. The resultant gel is treated as described in Example 1 to form a cation-exchanger.

Example 6

On following the procedure of the foregoing example, however, using 87 parts of phenol and 12 parts of 1.7-dihydroxy naphthalene instead of resorcin, homogeneous gels and exchangers with similar properties are also obtained.

Example 7

100 parts of crude phenol consisting of about 50 per cent by weight of phenol and about 50 per cent by weight of cresol homologues are dissolved in 480 parts of the preliminary condensation product obtained according to Example 3. Thereto is added a solution of 32 parts of 1.8-dihydroxynaphthalene-3.6-disulfonic acid in 188 parts of water and 75 parts of formalin of 30% strength. Thereupon the mixture is heated to 50–55° C. for two hours, a further 125 parts of formalin are introduced with stirring within 5 minutes, the mixture is left standing at raised temperature for some hours and the resultant gel is further treated as described in Example 1.

By replacing in the above reaction the crude phenol by 75 parts of pure phenol and 22 parts of x-cresol or 94 parts of pure phenol, clear gels are likewise obtained.

Example 8

32 parts of 1-amino-8-hydroxynaphthalene-3.6-disulfonic acid are dissolved in 186 parts of water with the addition of 8 parts of caustic soda solution of 50% strength and simultaneously added to a solution of 94 parts of phenol in 480 parts of the preliminary condensation product obtained according to Example 3. The mixture is heated to 60° C. within 3 hours and is kept at this temperature for some hours. Further processing for forming an exchanger corresponds to that of Example 1. Condensation may also be carried out in two steps as described in Example 7.

Example 9

94 parts of phenol are dissolved in 570 parts of the preliminary condensation product obtained according to Example 3 and the solution of 11 parts of 1-hydroxynaphthalene-6-sulfonic acid or -7-sulfonic acid in 125 parts of water and 200 parts of formalin of 30% strength are added. After standing for 48 hours at room temperature the mixture is heated to 60–70° C. and kept at that temperature for 6–8 hours. The resultant gel is treated as described in Example 1.

Clear gels are likewise obtained when replacing in the above reaction 1-hydroxynaphthalene sulfonic acid by 12 parts of 1.6-dihydroxynaphthalene-3-sulfonic acid or 12 parts of 1.7-dihydroxynaphthalene-3-sulfonic acid or 8 parts of 1.8-dihydroxynaphthalene-3.6-disulfonic acid.

Example 10

The solution of 26 parts of 1-aminobenzene-3-sulfonic acid and 12 parts of caustic soda solution of 50% strength in 82 parts of water and 75 parts of formalin of 30% strength are added to a solution of 80 parts of phenol in 600 parts of the preliminary condensation product obtained according to Example 3. The mixture is heated at 50-55° C. for 4 hours and after adding a further 125 parts of formalin the temperature is increased to 75-80° C. The resultant clear gel is treated as described in Example 1 to form a cation-exchanger.

Example 11

A solution of 18 parts of 1-amino-5-hydroxy-naphthalene-7-sulfonic acid and 6 parts of caustic soda solution of 50% strength in 82 parts of water and 200 parts of formalin of 30% strength are stirred into 94 parts of phenol dissolved in 600 parts of the preliminary condensation product obtained according to Example 3. The mixture is left standing at room temperature for 24 hours and thereafter heated to 60-90° C. The resultant clear gel is treated according to Example 1 to form a cation-exchanger.

Example 12

A solution of 8 parts of phenyl amino acetic acid and 2 parts of sodium hydroxide in 101 parts of water and 200 parts of formalin of 30% strength are added to a solution of 89 parts of phenol in 600 parts of the preliminary condensation product obtained according to Example 3. The solution is left standing at room temperature for 48 hours and is subsequently heated to 60° C. for 5 hours. The resultant clear gel is worked up as described in Example 1.

Example 13

132 parts of phenol and 47 parts of 1-hydroxy-butane-1.3-disulfonic acid obtainable from croton aldehyde and sulfur dioxide in an aqueous solution, are dissolved in 480 parts of the preliminary condensation product obtained according to Example 3 and heated under reflux for two hours. The solution of the reaction product is diluted with 53 parts of water and mixed with 75 parts of formalin of 30% strength at 50° C. After two hours a further 213 parts of formalin are added at the same temperature and the mixture is heated at 60-70° C. for about 5-6 hours. The resultant gel is worked up to form a cation-exchanger as described in Example 1. The product thus obtained shows good mechanical properties.

The reaction product is likewise obtained, for instance, according to the following reactions:

(a) The above-said quantity of phenol is heated with water and the above hydroxy butane disulfonic acid is refluxed for two hours. 75 parts of formalin of 30% strength are subsequently added at 50° C. and the temperature is kept at 50° C. for two hours. The reaction product thus obtained is stirred into the preliminary condensation product of the naphthalene sulfonic acaid obtained according to Example 3. Thereupon 213 parts of formalin are added at 50° C.

(b) 38 parts of phenol and the above-said quantities of water and hydroxy butane disulfonic acid are heated under reflux for two hours with the addition of one part of concentrated sulfuric acid. After adding a further 94 parts of phenol and 75 parts of formalin of 30% strength the mixture is reacted at 50° C. for two hours. The resultant reaction product is stirred with the preliminary condensation product obtained according to Example 3 and the residual formalin is added at 50° C.

(c) The reaction product obtained from 38 parts of phenol, water and hydroxy butane disulfonic acid according to (b) is introduced into the solution of 94 parts of phenol in the preliminary condensation product obtained according to Example 3. Thereto are added at 50° C. 75 parts of formalin of 30% strength and the residual amount of formalin after two hours at the same temperature.

Example 14

11 parts of resorcin and 16 parts of benzaldehyde-2.4-sodium disulfonate are dissolved in 138 parts of water. Thereupon one part of concentrated sulfuric acid is introduced into the resultant solution which is heated to boiling for two hours. 94 parts of phenol, 540 parts of the preliminary condensation product obtained according to Example 3 and, at a temperature of 50° C., 75 parts of formalin of 30% strength are subsequently added and the mixture is kept at 50° C. for two hours. Thereupon a further 125 parts of formalin are added at 50° C. The mixture is then heated at 60-90° C. for 5-6 hours and the resultant clear gel is worked up as described in Example 1.

Example 15

94 parts of phenol, 600 parts of the preliminary condensation product obtained according to Example 3, 135 parts of water and 51 parts of 2.8-dihydroxynaphthalene-3-carboxylic acid are heated to the boil. After cooling to 50° C. 75 parts of formalin of 30% strength are added. After stirring for two hours at 50-60° C. a further 145 parts of formalin are introduced into the mixture which is heated at 60-90° C. for 5-6 hours and the resultant clear gel is worked up as described in Example 1.

Clear gels are likewise obtained by replacing in the above reaction 2.8-dihydroxynaphthalene-3-carboxylic acid by 57 parts of 2.8-dihydroxy-naphthalene-6-sulfonic acid.

We claim:

1. A process for the production of cation exchange resins which consists essentially of condensing in the following proportions, and in an acid medium until a gel is formed, (a) formaldehyde, (b) 1 mol of a formaldehyde-reactive naphthalene monosulfonic acid of the group consisting of α-naphthalene monosulfonic acid, β-naphthalene monosulfonic acid, alkyl substitution products thereof and water soluble preformed aldehyde condensation products thereof, (c) 0.5 to 3 mols of a member of the class consisting of phenols and alkyl substitution products thereof reactive with formaldehyde to form gels, said phenols having the formula

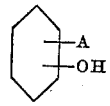

wherein A is a member of the group consisting of hydrogen,

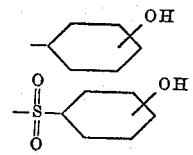

and 

and (d) 2 to 50 mol percent referred to the mols of (c) of a compound containing an aromatic ring selected from the group consisting of benzene and naphthalene and having substituted on the aromatic ring a group selected from the class consisting of hydroxyl and amino groups and containing at least one additional group which is water-solubilizing and selected from the class consisting of hydroxyl, carboxyl, sulfonic acid and sulfonamide groups, the formaldehyde being used in an amount of more than one mol for every mol of all the other reactants, and drying the resultant gel to form a water insoluble resin.

2. A process for the production of cation exchange resins which consists essentially of condensing in the following proportions, and in an acid medium until a gel is formed, (a) formaldehyde, (b) 1 mol of a formaldehyde-reactive naphthalene monosulfonic acid of the group consisting of α-naphthalene monosulfonic acid, β-naphthalene monosulfonic acid, alkyl substitution products thereof and water soluble preformed aldehyde condensation products thereof, (c) 0.5 to 3 mols of a member of the class consisting of phenols and alkyl substitution products thereof reactive with formaldehyde to form gels, said phenols having the formula

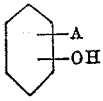

wherein A is a member of the group consisting of hydrogen,

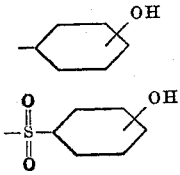

and (d) 2 to 50 mol percent referred to the mols of (c) of a compound which is a condensation product of 2 mols of phenol with one mol of 1-hydroxybutane 1.3-disulfonic acid, the formaldehyde being used in an amount of more than one mol for every mol of all the other reactants, and drying the resultant gel to form a water insoluble resin.

3. A process according to claim 1 wherein the naphthalene monosulfonic acid is the technical sulfonation mixture as obtained in the monosulfonation of technical naphthalene at 160–165° C.

4. A process according to claim 1, wherein the naphthalene monosulfonic acid is preliminarily condensed with formaldehyde to form a water-soluble condensation product before mixing with the other components.

5. A process according to claim 1, wherein the monohydric phenol is phenol.

6. A process according to claim 1, wherein the phenol is dihydroxydiphenylsulfone.

7. A process according to claim 1, wherein the fourth component is 1,8-dihydroxynaphthalene-3,6-disulfonic acid.

8. A cation-exchanging resin obtained according to the process defined in claim 1.

9. A process according to claim 1, wherein the fourth component is resorcin.

10. A process according to claim 1, wherein the fourth component is 1-hydroxyl-8-naphthylamino-3,6-disulfonic acid.

References Cited in the file of this patent

UNITED STATES PATENTS

| Number | Name | Date |
|---|---|---|
| 2,099,717 | Alles | Nov. 23, 1937 |
| 2,204,539 | Wassenegger | June 11, 1940 |
| 2,282,264 | Stiasny | May 5, 1942 |
| 2,333,754 | Wassenegger | Nov. 9, 1943 |
| 2,529,602 | Frohmader | Nov. 14, 1950 |